(12) United States Patent
Kurosumi

(10) Patent No.: US 10,340,835 B2
(45) Date of Patent: Jul. 2, 2019

(54) CHIP EVACUATION DEVICE DRIVEN BY SYNCHRONOUS MOTOR

(71) Applicant: FANUC Corporation, Yamanashi (JP)

(72) Inventor: Yasuhiko Kurosumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 9 days.

(21) Appl. No.: 15/190,185

(22) Filed: Jun. 23, 2016

(65) Prior Publication Data

US 2016/0380574 A1 Dec. 29, 2016

(30) Foreign Application Priority Data

Jun. 26, 2015 (JP) .................................. 2015-128239

(51) Int. Cl.
*H02P 29/028* (2016.01)
*H02P 29/032* (2016.01)
*B23Q 11/00* (2006.01)

(52) U.S. Cl.
CPC .......... *H02P 29/028* (2013.01); *H02P 29/032* (2016.02); *B23Q 11/0042* (2013.01)

(58) Field of Classification Search
CPC ........................ B23Q 11/0042; H02P 29/028
See application file for complete search history.

(56) References Cited

U.S. PATENT DOCUMENTS

| 2002/0174989 A1* | 11/2002 | Katayama | B24B 3/245 166/358 |
| 2003/0066179 A1* | 4/2003 | Shiba | B23Q 11/0042 29/426.3 |
| 2013/0014967 A1* | 1/2013 | Ito | B25F 5/00 173/93 |
| 2013/0342143 A1* | 12/2013 | Sonoda | H02P 6/08 318/400.21 |
| 2014/0232306 A1* | 8/2014 | Yasui | H02P 6/00 318/400.02 |
| 2014/0312813 A1* | 10/2014 | Murchie | A47L 9/2842 318/400.03 |

FOREIGN PATENT DOCUMENTS

| JP | 61-173839 A | 8/1986 |
| JP | 63-105863 A | 5/1988 |
| JP | 3-126538 U | 12/1991 |
| JP | 4-17039 U | 2/1992 |
| JP | 10-202470 A | 8/1998 |
| JP | 2000-94263 A | 4/2000 |

(Continued)

OTHER PUBLICATIONS

Driving Control Device for Conveyor; Inventor(s): Takeda Yoshio; JP2010137931, Dated Jun. 24, 2010.*

(Continued)

*Primary Examiner* — Muhammad S Islam
(74) *Attorney, Agent, or Firm* — Hauptman Ham, LLP

(57) ABSTRACT

In a chip evacuation device that evacuates chips produced in a machine tool to outside of the machine tool, a synchronous motor is used as a power source for the chip evacuation device. A load on the synchronous motor is monitored and a number of rotation or a direction of rotation of the synchronous motor is changed when it is determined that the load exceeds a preset threshold.

10 Claims, 6 Drawing Sheets

(56) References Cited

FOREIGN PATENT DOCUMENTS

| JP | 2002-143612 A | 5/2002 |
|---|---|---|
| JP | 2005-39889 A | 2/2005 |
| JP | 2005-138259 A | 6/2005 |
| JP | 2007-32712 A | 2/2007 |
| JP | 2010-137931 A | 6/2010 |

OTHER PUBLICATIONS

Office Action in JP Application No. 2015-128239, dated Jun. 27, 2017, 11 pp.

* cited by examiner

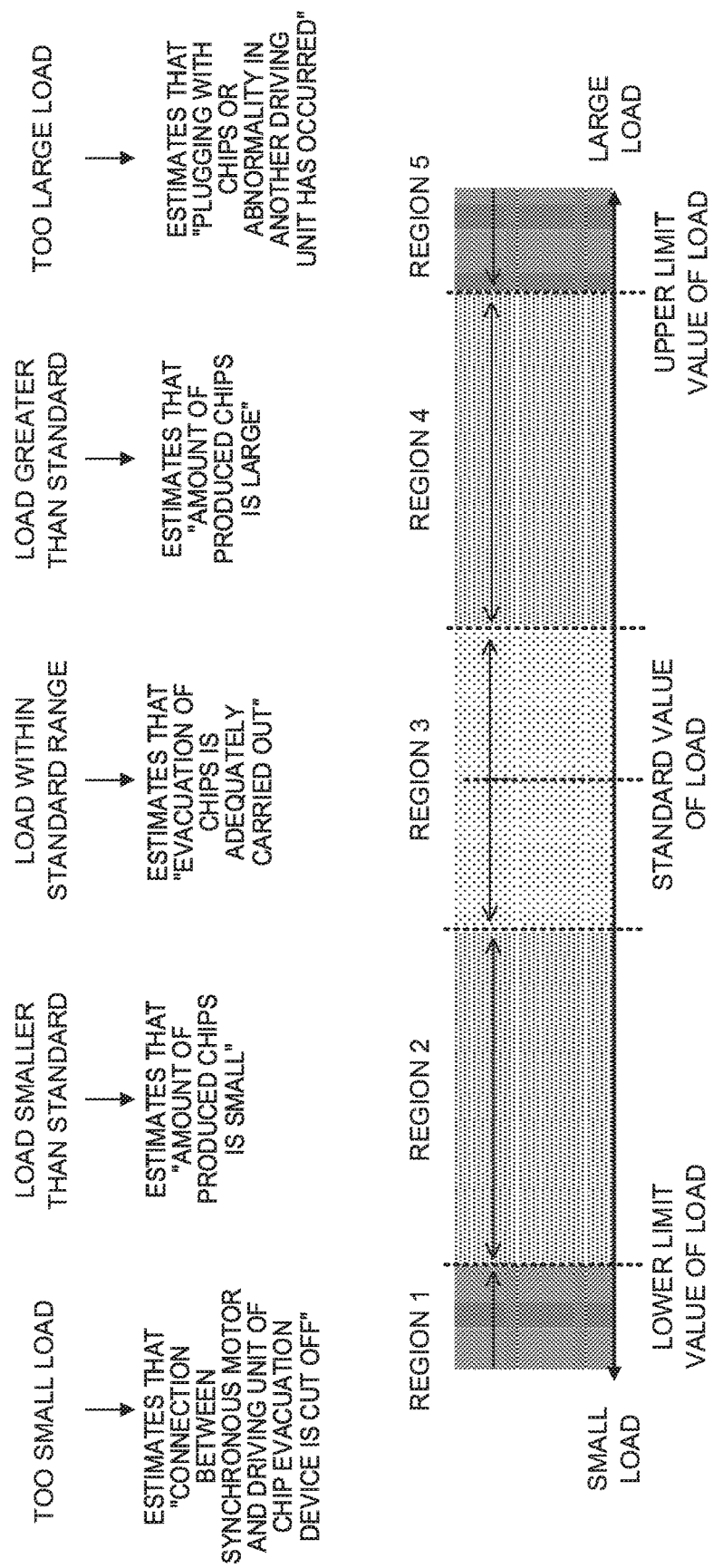

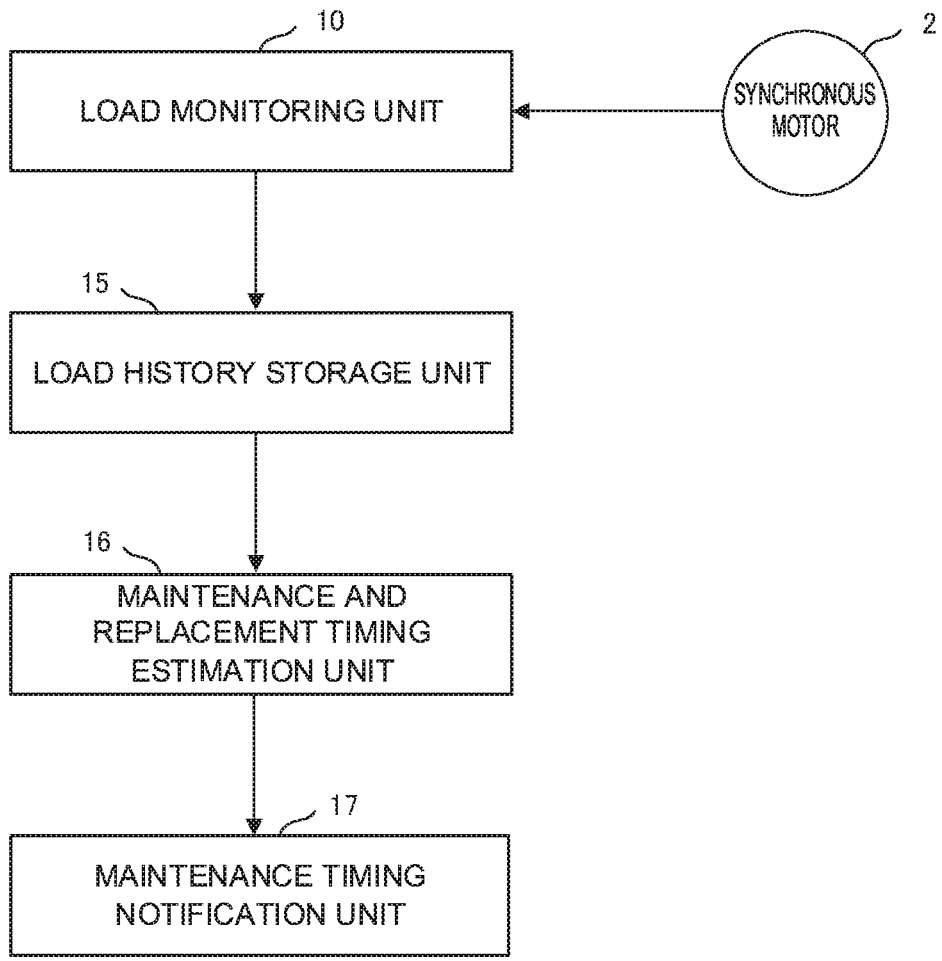
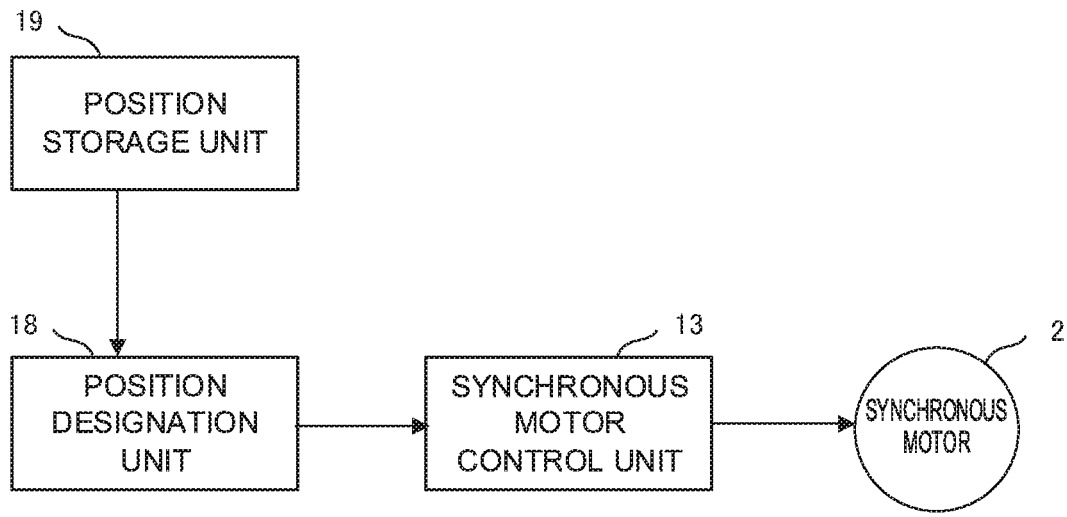

CHIP EVACUATION DEVICE DRIVEN BY SYNCHRONOUS MOTOR

RELATED APPLICATIONS

The present application claims priority to Japanese Patent Application Number 2015-128239, filed Jun. 26, 2015, the disclosure of which is hereby incorporated by reference herein in its entirety.

BACKGROUND OF THE INVENTION

1. Field of the Invention

The present invention relates to a chip evacuation device and particularly relates to a chip evacuation device in which operation of a driving unit can freely be controlled depending on situations.

2. Description of the Related Art

In chip evacuation devices such as chip conveyors, commonly, an induction motor and an electromagnetic switch or an magnetic contactor are used as a driving source. Number of rotation of induction motors depends on power supply voltage and is therefore made constant except for occasions of start and stoppage of operation of the induction motors. Direction of rotation of induction motors is restricted to one direction in general.

Japanese Patent Application Laid-Open No. 2010-137931 discloses use of an inverter (in place of an electromagnetic switch or an magnetic contactor) as feed changing means that is capable of switching an induction motor into any of drive statuses, that is, forward rotation, stoppage, and reverse rotation by changing status of feed from a power source to the induction motor in a drive controller for a conveyor that controls the status of feed to the induction motor in the conveyor.

In a configuration in which an induction motor is controlled with use of an magnetic contactor or an electromagnetic switch, the number of rotation of the induction motor depends on a frequency of power supply and thus cannot be changed to an arbitrary number. Besides, it is impossible to make a change between forward rotation and reverse rotation unless a reversible magnetic contactor is used. Accordingly, there is a problem in that operation of a chip conveyor, that is, number of rotation of the driving source, cannot automatically be changed in accordance with status of production or deposition of chips in a machine tool.

In a prior art technique disclosed in Japanese Patent Application Laid-Open No. 2010-137931 described above, the induction motor can be operated at an arbitrary number of rotation including that for the reverse rotation, whereas the induction motor (and a driving unit of the chip evacuation device) cannot be moved to and stopped at an arbitrary position because any rotation detector is not used in the induction motor and because any means for receiving and processing signals from a rotation detector is not included in the induction motor.

In addition, it is impossible to check the direction of rotation of the induction motor because operation of the induction motor is not monitored. Therefore, the induction motor may be rotated in a direction different from an intended direction because of wiring errors in the induction motor or the like.

SUMMARY OF THE INVENTION

An object of the present invention is to provide a chip evacuation device in which operation of a driving unit can freely be controlled depending on situations.

The chip evacuation device according to the invention evacuates chips produced in a machine tool to outside of the machine tool and includes a synchronous motor as a power source for the chip evacuation device, a load monitoring unit that monitors a load on the synchronous motor or on the driving unit of the chip evacuation device which is operated by the synchronous motor, a threshold storage unit that stores at least one threshold of the load on the synchronous motor or on the driving unit of the chip evacuation device which is operated by the synchronous motor, a comparison unit that makes comparison between the load monitored by the load monitoring unit and the threshold stored in the threshold storage unit, and a synchronous motor control unit that changes a number of rotation or a direction of rotation of the synchronous motor in accordance with results of the comparison made by the comparison unit.

When the actual load exceeds the threshold as a result of the comparison made by the comparison unit, at least either of the number of rotation and a frequency of operation of the synchronous motor may be increased, at least either of stoppage of the operation of the synchronous motor and notification of abnormality may be carried out, or reverse rotation of the synchronous motor for a certain period of time and subsequent return to forward rotation may be caused. When the actual load falls below the threshold, at least either of the number of rotation and the frequency of operation of the synchronous motor may be decreased or at least either of the stoppage of the operation of the synchronous motor and the notification of abnormality may be carried out.

The chip evacuation device may further include a load history storage unit that stores a history of load status of the synchronous motor, an estimation unit that estimates status of wear on and maintenance and replacement timing for the synchronous motor or the chip evacuation device based on the history of the load status, and a notification unit that notifies the maintenance and replacement timing based on results of estimation by the estimation unit.

The synchronous motor control unit may be provided on a controller different from a controller that controls the machine tool.

Control over the synchronous motor can be carried out based on command codes of a machining program for the machine tool or information on cutting load at the time of machining by the machine tool.

In the invention, a chip evacuation system that includes a plurality of chip evacuation devices mentioned above and that has the plurality of chip evacuation devices controlled by one controller is built up.

According to the invention, the driving unit of the chip evacuation device can appropriately be controlled in accordance with status of deposition of chips, status of production of chips, and/or the like in the machine tool. In addition, maintenance costs can be reduced by notification of the maintenance and replacement timing in accordance with the history of the load status, position control during maintenance, and/or the like.

BRIEF DESCRIPTION OF THE DRAWINGS

The above-mentioned and other objects and features of this invention will become apparent from the following description of the embodiments with reference to the accompanying drawings, in which:

FIG. 6 is a representation illustrating an example of estimation of chip evacuation status according to the first embodiment of the invention;

FIG. 8 is a schematic functional block diagram illustrating a chip evacuation device according to a third embodiment of the invention; and FIG. 9 is a schematic functional block diagram illustrating a chip evacuation device according to a fourth embodiment of the invention.

DETAILED DESCRIPTION OF THE PREFERRED EMBODIMENTS

Initially, a first embodiment of a chip evacuation device according to the invention will be described with use of FIGS. 1 through 6.

Figure 1:
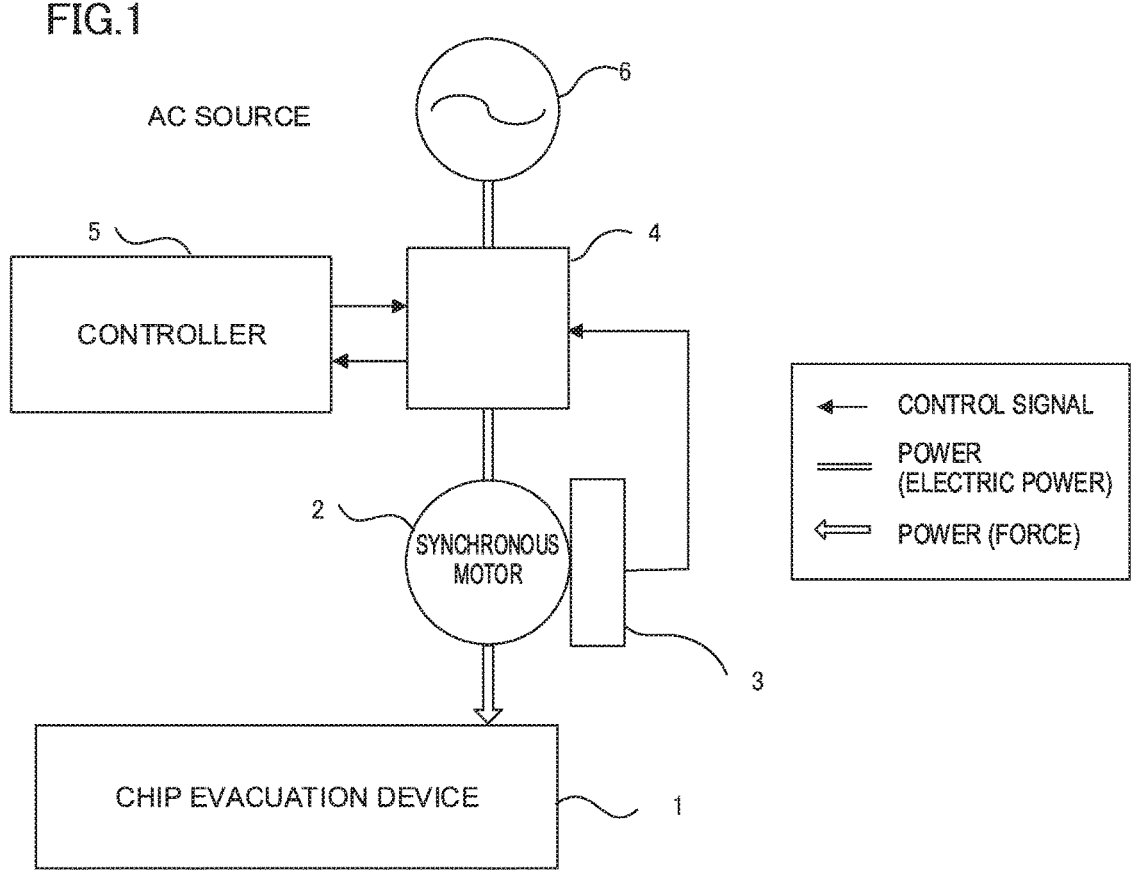
FIG. 1 is a schematic configuration illustrating a first example of a chip evacuation device according to a first embodiment of the invention.

FIG. 1 illustrates a configuration example of the first embodiment of the chip evacuation device according to the invention.

A driving unit of the chip evacuation device 1 is driven by a synchronous motor 2. A control instrument (servo amplifier) 4 for synchronous motor controls the synchronous motor 2 by power from an AC source 6 based on command signals from a controller 5 and carries out feedback to the controller 5 while receiving signals from a rotation detector 3 mounted on the synchronous motor 2.

The synchronous motor 2 may be mounted on a main body of the chip evacuation device 1 or may be separable from the chip evacuation device 1 so as to be driven after being moved and coupled by an automatic transfer device (not illustrated) only when needed. In consideration of convenience of device configuration, however, it is preferable that the synchronous motor 2 is included in or is adjacent to the main body of the chip evacuation device 1.

Figure 2:
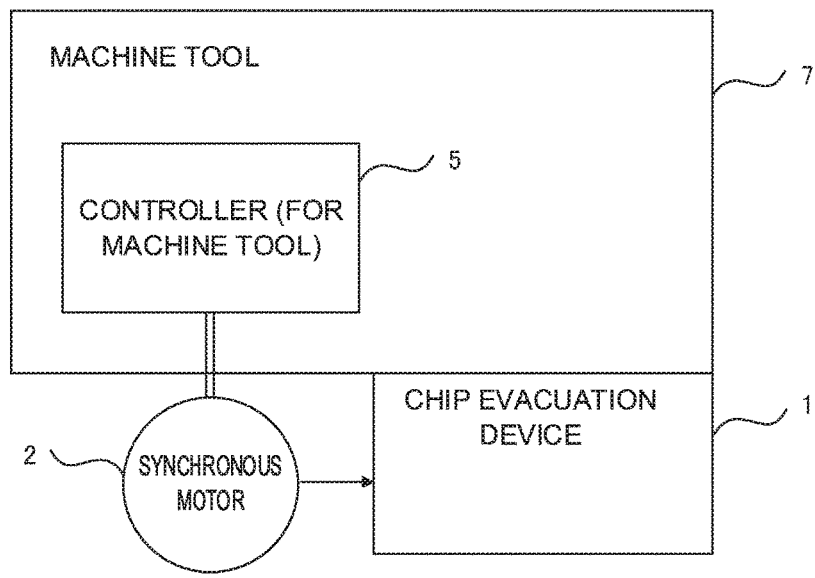
FIG. 2 is a schematic configuration illustrating a second example of the chip evacuation device according to the first embodiment of the invention.

The controller 5 that controls the synchronous motor 2 may be a controller that is provided outside a machine tool in order to control operation of the chip evacuation device 1 or the controller 5 that controls a machine tool 7 may be used therefor as illustrated in FIG. 2.

Figure 3:
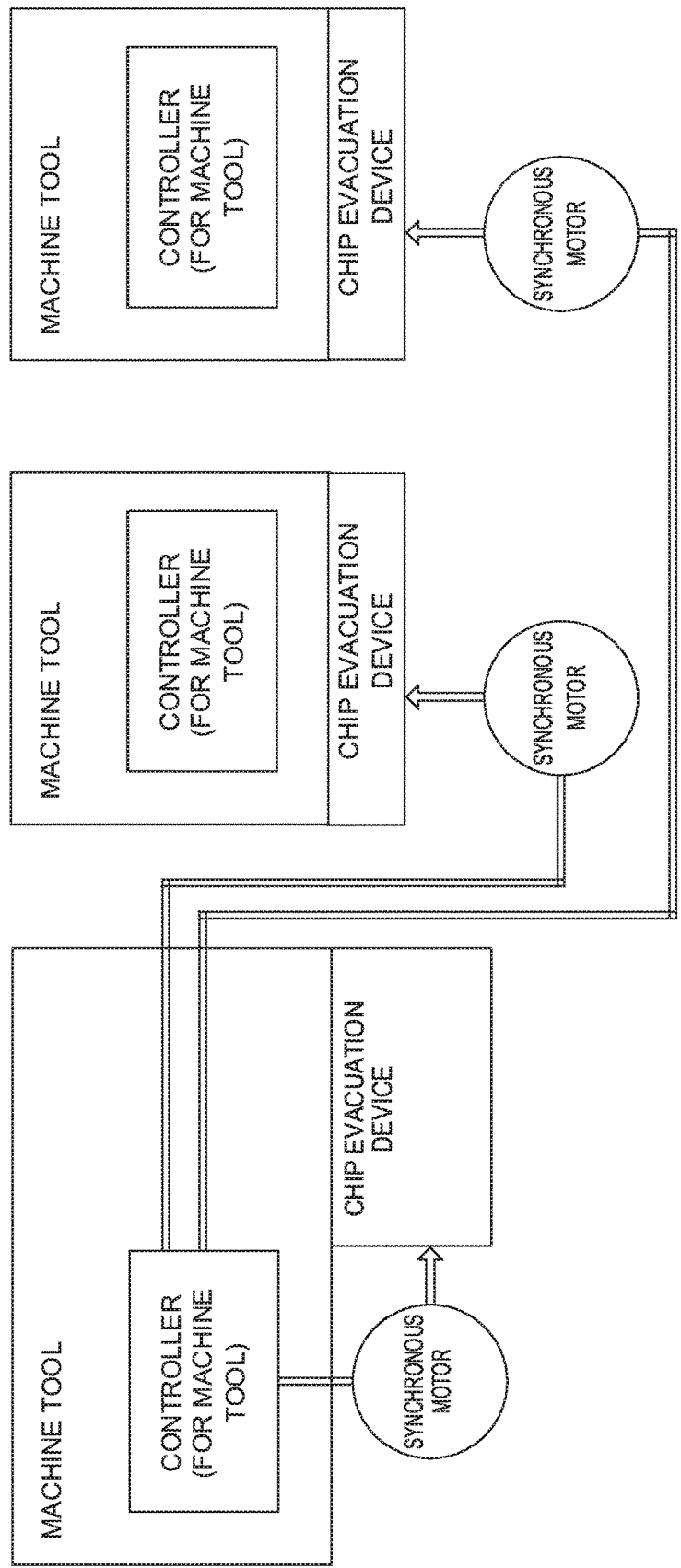
FIG. 3 is a schematic configuration illustrating a third example of the chip evacuation device according to the first embodiment of the invention.
Figure 4:
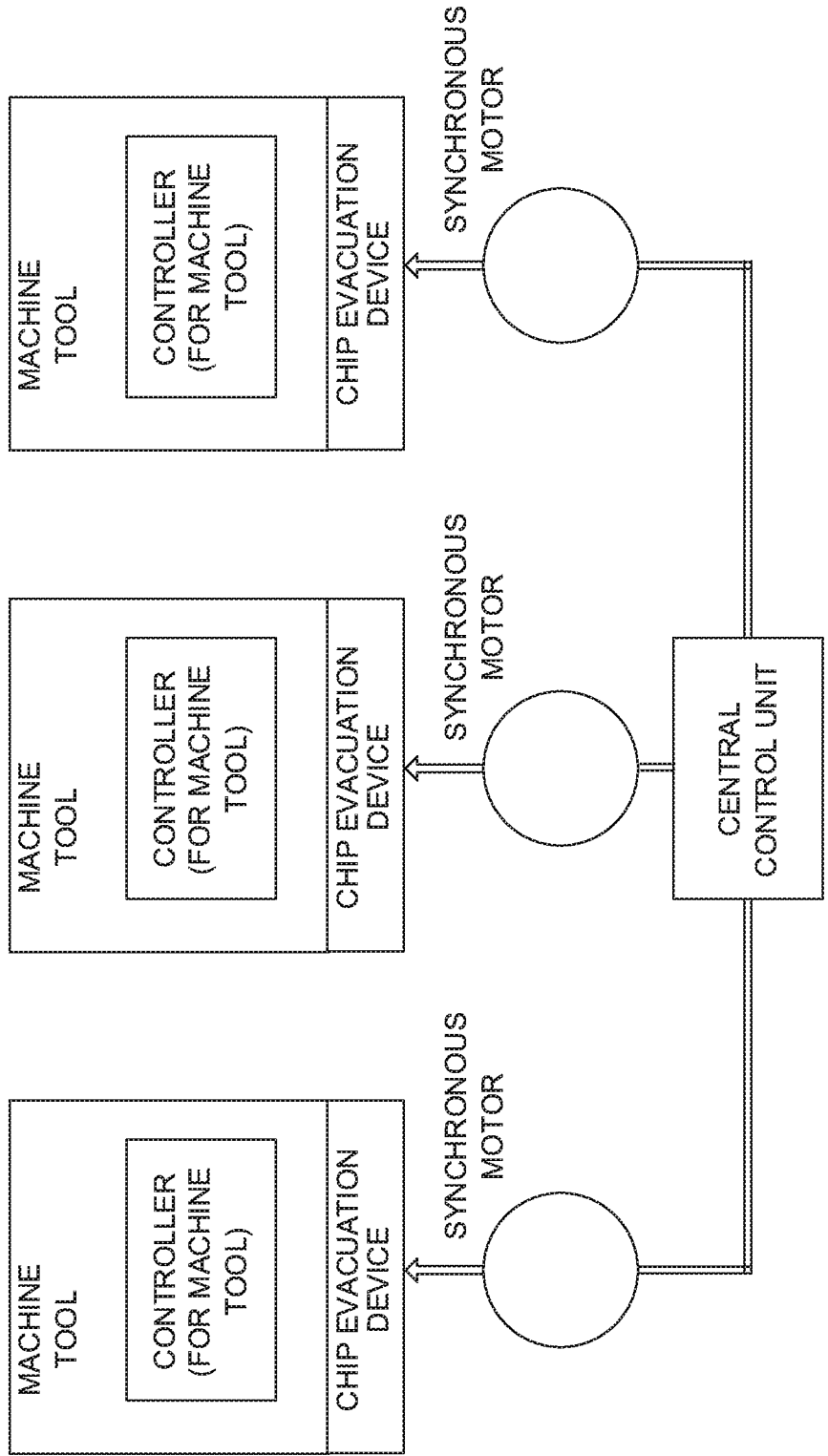
FIG. 4 is a schematic configuration illustrating a fourth example of the chip evacuation device according to the first embodiment of the invention.

The controller 5 that controls the synchronous motor 2 needs not be the controller that controls the machine tool to which the chip evacuation device 1 is connected. For instance, a controller that controls one machine tool may control synchronous motors (that operate as driving sources for chip evacuation devices) respectively connected to a plurality of other machine tools as illustrated in FIG. 3 or a sequencer (central control unit) provided for managing production lines may control synchronous motors (that operate as driving sources for a plurality of chip evacuation devices) as illustrated in FIG. 4. Alternatively, a controller for robots in production lines or the like may be used therefor. In FIGS. 2 through 4, depiction of the control instruments (servo amplifiers) 4 for synchronous motor, the rotation detectors 3, and connecting wires thereto and therefrom is omitted.

A shape of the chip evacuation device 1 according to the invention does not particularly matter. Conveyors of chip conveyors, driving means for screws of chip augers, and the like fall under the chip evacuation device 1 according to the invention. The rotation detectors 3 is mounted on the synchronous motor 2 that is commonly used and is capable of detecting a direction of rotation of the synchronous motor 2 as well as a speed of rotation and a phase of rotation thereof. As a result, it is made possible to detect rotation of the synchronous motor 2 in a direction opposite to an intended direction due to wiring errors.

The control instrument 4 for synchronous motor or the controller 5 that is illustrated in FIG. 1 has functions below.

Function a: a function of measuring or estimating load status of the synchronous motor 2 or of the driving unit of the chip evacuation device 1

Function b: a function of inputting and storing a reference value or a reference range for determination of a load on the synchronous motor 2 or on the driving unit of the chip evacuation device 1

Figure 5:
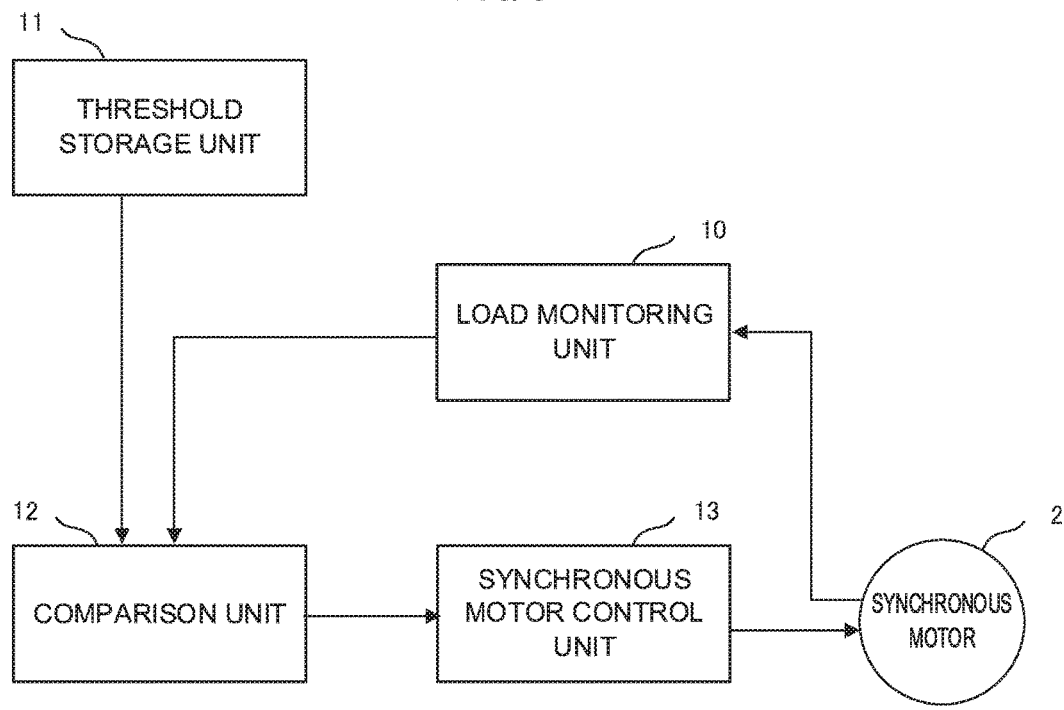
FIG. 5 is a functional block diagram for explaining that the chip evacuation device having a structure illustrated in any of FIGS. 1 through 4 attains functions a through e.

Function c: a function of comparing the load status obtained by the function a with the reference value or the reference range stored in the function b Function d: a function of estimating status of the synchronous motor 2, status of the driving unit of the chip evacuation device 1, or status of production of chips in the machine tool 7, based on results of comparison in the function c Function e: a function of automatically changing operation of the synchronous motor 2, the driving unit that is driven by the synchronous motor 2, or the chip evacuation device 1 in accordance with results of estimation in the function d FIG. 5 is a functional block diagram for explaining that the chip evacuation device having a structure illustrated in any of FIGS. 1 through 4 attains the functions a through e described above.

A load monitoring unit 10 is functional means corresponding to the function a and is provided as a standard in general in the controller 5 or the control instrument 4 for synchronous motor. For load monitoring by the load monitoring unit 10, measurement of a current that is applied from the power source to the synchronous motor 2, torque command signals that are transmitted from the controller 5 to the control instrument 4 for synchronous motor, or the like may be used or the load on the driving unit of the chip evacuation device 1 that is driven by the synchronous motor 2 may be measured with use of a load sensor (not illustrated), for instance.

Furthermore, the load monitoring unit 10 may monitor mechanical load information during machining in addition to the synchronous motor 2 for the chip evacuation device 1. As specific examples, load information on a synchronous motor for a feed axis during machining, load information on a motor for a main spindle for rotating a tool, and/or the like may be monitored.

The status of production of chips can more accurately be estimated with stand-alone use of the mechanical load information during machining or combinational use of the mechanical load information and load information on the synchronous motor 2 for the chip evacuation device 1. Particularly, combination of the mechanical load information during machining and the load information on the synchronous motor 2 makes it possible to determine whether an increase in the load on the synchronous motor 2, for instance, has been caused by an increase in amount of evacuation of chips or by a failure such as deterioration and wear of the driving unit of the chip evacuation device.

A threshold storage unit 11 is functional means corresponding to the function b and it is conceivable that the load on the synchronous motor 2 that is obtained when the synchronous motor 2 for the chip evacuation device 1 is driven so that chips in the machine tool 7 are smoothly evacuated in status where the chips are actually produced and that is monitored by the load monitoring unit 10 is stored as the reference value of the load in "standard status of chip evacuation" in the threshold storage unit 11, for instance. The reference value for the load may be a specific value but it is preferable for practical use that the reference value has a certain width (range). It is preferable that the reference value for the load can freely be set within a rated range for the synchronous motor 2 by an operator and that a plurality of reference values can be stored because "standard status of chip evacuation" and the value of the load are thought to fluctuate depending on material of an object to be machined, a machining program, and/or determination by an operator.

The threshold storage unit 11 may be configured so as to be capable of storing either or both of an upper limit value and a lower limit value of the load, in addition to the reference value. It is conceivable that the upper limit value of the load which is to be stored in the threshold storage unit 11 is set as follows, for instance.

(i) An upper limit value of a rated load on the synchronous motor 2 or a value somewhat lower than the upper limit value.

(ii) A value that is set to such an extent that breakage of the driving unit (a belt of a belt conveyor or a screw of a chip auger) of the chip evacuation device 1 is avoided.

It is conceivable that the lower limit value of the load which is to be stored in the threshold storage unit 11 is set to a value of the load obtained when the synchronous motor 2 rotates in a state separated from the driving unit of the chip evacuation device 1, for instance.

A comparison unit 12 is functional means corresponding to the function c and means for simply making comparison between the value of the load that is monitored by the load monitoring unit 10 and the reference value of the load that is stored in the threshold storage unit 11. For making the comparison, a plurality of reference values of the load may be stored in the threshold storage unit 11 in advance and a function of switching the reference value to be compared from among the reference values in accordance with the machining program or a type of machining may be provided, for instance.

A synchronous motor control unit 13 is functional means corresponding to the function d and the function e. The synchronous motor control unit 13 estimates status of deposition of chips or the status of production of chips in the machine tool, status of transfer of chips, and/or the like based on results of the comparison made by the comparison unit 12 and controls the operation of the synchronous motor 2, the driving unit that is driven by the synchronous motor 2, or the chip evacuation device 1 in accordance with results of such estimation. Such estimation as illustrated in FIG. 6 is conceivable, for instance, as an example of the estimation of the status of deposition of chips or the status of production of chips in the machine tool, the status of transfer of chips, and/or the like based on the results of the comparison made by the comparison unit 12.

An example of control over the operation of the chip evacuation device 1 based on the example of the estimation illustrated in FIG. 6 will be described below.

Region 3: When the load on the driving unit of the chip evacuation device 1 is within the standard range, it is estimated that "evacuation of chips is normally carried out" and change in the number of rotation of the synchronous motor 2 is not carried out.

Region 2: When the load slightly decreases from the standard value so as to reach a region (region 2) between a lower limit of the standard range (region 3) of the load and the lower limit value of the load, it is estimated that "an amount of produced chips is small" and the number of rotation of the synchronous motor 2 is decreased so that the load comes within the region 3, in order to reduce power consumption by the synchronous motor 2.

Region 1: When the load is so small as to reach a region (region 1) not greater than the lower limit value of the load, it is estimated that "connection between the synchronous motor 2 and the driving unit of the chip evacuation device 1 is cut off" and the rotation of the synchronous motor 2 is stopped. In addition, the operator is notified of such purport by display of an alarm or a message on a screen of the controller 5 for the machine tool 7, or the like.

Region 4: When the load slightly increases from the standard value so as to reach a region (region 4) between an upper limit of the standard range (region 3) of the load and the upper limit value of the load, it is estimated that "the amount of produced chips is large" and the number of rotation of the synchronous motor 2 is increased so that the load comes within the region 3, in order to prevent retention of chips in the machine tool 7.

Region 5: When the load is so large as to reach a region (region 5) not smaller than the upper limit value of the load, it is estimated that "an abnormality in chips or another driving unit has occurred" and the rotation of the synchronous motor 2 is stopped. In addition, the operator is notified of such purport by display of an alarm or a message on the screen of the controller 5 of the machine tool 7, or the like.

Though the above example presupposes that the synchronous motor 2 for the chip evacuation device 1 continuously rotates at a constant speed when the load on the synchronous motor 2 is in normal status (region 3), the synchronous motor 2 may be caused to rotate intermittently, for instance, so that intervals of the rotation and stoppage may be increased or decreased in accordance with the load status or so that both the intervals of the rotation and stoppage and the number of rotation may be fluctuated.

Subsequently, a second embodiment of a chip evacuation device according to the invention will be described with use of FIG. 7.

The chip evacuation device according to the embodiment is similar in basic configuration to the chip evacuation device according to the first embodiment illustrated in FIGS. 1 through 4 except that a function of exerting control, based on monitoring of the load status of the synchronous motor, by the machining program is provided.

Figure 7:
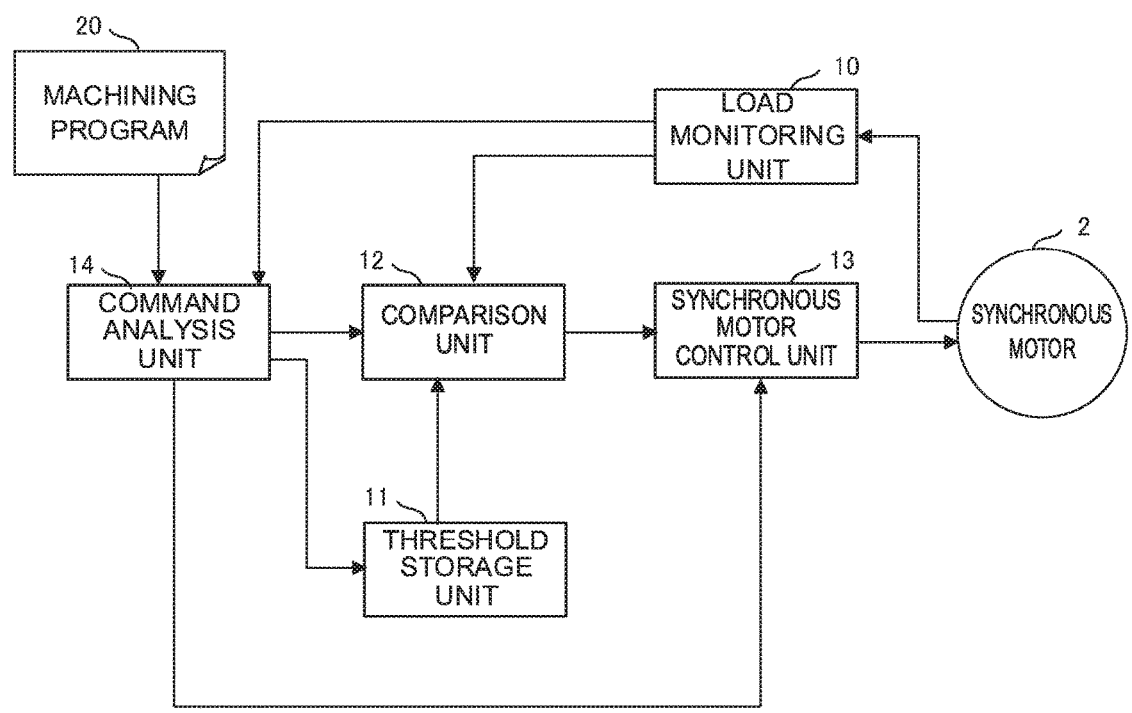
FIG. 7 is a schematic functional block diagram illustrating a chip evacuation device according to a second embodiment of the invention.

FIG. 7 shows a schematic functional block diagram for the chip evacuation device that has a configuration illustrated in any of FIGS. 1 through 4 and that attains the functions described above.

A load monitoring unit 10, a threshold storage unit 11, a comparison unit 12, and a synchronous motor control unit 13 that are illustrated in FIG. 7 are similar to those described for FIG. 5 (first embodiment).

A command analysis unit 14 makes an analysis of a machining program 20 stored in a memory (not illustrated)

or inputted from MDI/display means (not illustrated) or the like and gives commands based on blocks of the machining program 20, to the threshold storage unit 11, the comparison unit 12, or the synchronous motor control unit 13 based on results of the analysis.

The commands based on the blocks of the machining program 20 include addition, deletion, and/or change of thresholds that are stored in the threshold storage unit 11, commands to change comparison processing that is performed by the comparison unit 12, direct control over the synchronous motor control unit 13 on the direction of rotation, the speed of rotation, a stop position, and/or the like of the synchronous motor 2 in accordance with status of machining by the machine tool based on the machining program 20, the current load status of the synchronous motor 2 that is obtained from the load monitoring unit 10, and/or the like, and addition, deletion, and/or change of estimation processing and control processing by the synchronous motor control unit 13, for instance.

On condition that the status of production of chips thus can be estimated to a certain extent from contents of the machining program, malfunction that might be caused by false detection of the load on the synchronous motor 2 or the like can be prevented by control over the synchronous motor 2 of FIG. 7.

One or more operating conditions such as the direction of rotation, the speed of rotation, and frequency of change in the number of rotation, including stoppage, of the synchronous motor 2 may be set and stored in advance as operating condition setting information for the synchronous motor 2 and the stored setting information may be read out based on block commands of the machining program 20, so that an operation pursuant to the conditions may be caused. This configuration makes it unnecessary to input detailed operating conditions on all such occasions. In addition, the operating conditions for the synchronous motor that have been set can be used by a plurality of machining programs and reduction in man-hours for input of the machining programs is consequently promoted.

Subsequently, a third embodiment of a chip evacuation device according to the invention will be described with use of FIG. 8.

The chip evacuation device according to the embodiment is similar in basic configuration to the chip evacuation device according to the first embodiment illustrated in FIGS. 1 through 4 except that a function of estimating maintenance timing by monitoring the load status of the synchronous motor is provided.

In the controller 5 that controls the synchronous motor 2, in general, the load status of the synchronous motor 2 can constantly be monitored by functional means provided as a standard inside the controller 5. In the chip evacuation device according to the embodiment, therefore, the load status of the synchronous motor 2 is continuously or intermittently stored together with driving time of the synchronous motor 2 so that a history is recorded and status of wear on the synchronous motor 2 and the chip evacuation device 1 is estimated from the history.

FIG. 8 illustrates a schematic functional block diagram for the chip evacuation device that has a configuration illustrated in any of FIGS. 1 through 4 and that attains the functions.

A load monitoring unit 10 illustrated in FIG. 8 is functional means that obtains the load on the synchronous motor 2 as described for the first embodiment (FIG. 5).

A load history storage unit 15 stores the load on the synchronous motor 2 that is monitored by the load monitoring unit 10, together with time information. Records of the load on the synchronous motor 2 may be stored continuously or may be stored intermittently at a specified frequency. The records may be taken each time a specified amount or more of change occurs in the load on the synchronous motor 2 that is monitored by the load monitoring unit 10.

A maintenance and replacement timing estimation unit 16 estimates the status of wear on the synchronous motor 2 and the chip evacuation device 1 based on the history of the load on the synchronous motor 2 that has been stored in the load history storage unit 15. A maintenance timing notification unit 17 notifies the operator of results of estimation by the maintenance and replacement timing estimation unit 16 with use of display on a screen, voices, lamps, and/or the like. An example of specific procedures for notification of the results of the estimation will be described below.

Estimation notifying procedure 1: A period of total driving time (maintenance timing) is determined in advance after which maintenance of the driving unit of the chip evacuation device is to be carried out on condition that the load on the driving unit of the chip evacuation device 1 is in the standard status. With advent of the determined maintenance timing on condition that the chip evacuation device continues being used in the standard status, the operator is notified of such purport by the maintenance timing notification unit 17.

Estimation notifying procedure 2: In case where there has been any term with the use in status in which the load is greater than the standard, the operator is notified of the advent of the maintenance timing by the maintenance timing notification unit 17 earlier than termination of the period of the estimation notifying procedure 1.

Estimation notifying procedure 3: In case where there has been any term with the use in status in which the load is smaller than the standard, the operator is notified of the advent of the maintenance timing by the maintenance timing notification unit 17 later than the termination of the period of the estimation notifying procedure 1.

Estimation notifying procedure 4: In both the estimation notifying procedure 2 and the estimation notifying procedure 3, a degree of change in the period to the maintenance timing may automatically be calculated in accordance with a degree of deviation of the load status from the standard and a length of the driving time during which the chip evacuation device 1 is driven in the load status.

Subsequently, a fourth embodiment of a chip evacuation device according to the invention will be described with use of FIG. 9.

The chip evacuation device according to the embodiment is similar in basic configuration to the chip evacuation device according to the first embodiment illustrated in FIGS. 1 through 4 except that a function of moving the synchronous motor to an arbitrary position based on information from the rotation detectors mounted on the synchronous motor is provided. With provision of such a function in the chip evacuation device, the driving unit may be moved to an arbitrary phase or an arbitrary position by the operator or a specified phase or a specified position may be stored in advance so that the driving unit can manually or automatically be moved to the position as needed.

The provision of the above-described function in the chip evacuation device according to the embodiment makes it possible for the operator to move a joint line of the conveyor belt or a fixation screw for the screw of the chip auger, for instance, to a position where the operator can instantly and easily conduct a work in maintenance and replacement and makes it possible to shorten time required for the maintenance and replacement.

FIG. 9 illustrates a schematic functional block diagram for the chip evacuation device that has a configuration illustrated in any of FIGS. 1 through 4 and that attains the functions.

A synchronous motor control unit 13 illustrated in FIG. 9 is functional means that controls the operation of the synchronous motor 2 as described for the first embodiment (FIG. 5).

A position designation unit 18 is functional means that is notified by the operator of an arbitrary phase or position of the driving unit of the chip evacuation device 1 and that controls the synchronous motor 2 so that the driving unit of the chip evacuation device 1 moves to the designated position. Designation by the operator of the phase or position of the driving unit of the chip evacuation device 1 may be carried out by operation of a control panel or the like or may be carried out with use of the machining program or the like. As for the phase or position of the driving unit of the chip evacuation device 1, typical values that are often used in works may be stored in a position storage unit 19 in advance so that the stored values can be read out and designated by operations by the operator.

Differences between the invention and the prior art technique will be described below.

In the chip evacuation device that is driven and controlled by the synchronous motor of the invention with such configurations as described above, the control over the chip evacuation device in accordance with the status of deposition of chips or the status of production of chips in the machine tool is better enabled in comparison with the control by the induction motor and the electromagnetic switch or the magnetic contactor as in the conventional chip evacuation device. In addition, the function of estimating the status of deposition of chips or the status of production of chips in the machine tool based on the load (current, torque) applied onto the synchronous motor and the function of automatically changing the number of rotation of the synchronous motor in accordance with the results of the estimation can be provided and such processing and operations as follows are consequently enabled.

(1) In case where the load on the synchronous motor is slightly above normal: It is determined that "chips produced with cutting work have increased or are great in amount" and automatic increase in the number of rotation of the synchronous motor promotes evacuation of the chips, prevents the retention of the chips in the machine tool, and thereby causes increase in operating rate of the machine tool including the chip discharging device.

(2) In case where the load on the synchronous motor is remarkably above normal: It is determined that "plugging with chips produced with cutting work has occurred" and a failure in the chip evacuation device is minimized by stoppage of the operation of the synchronous motor and the notification of abnormality or the plugging with the chips is removed by automatic reverse rotation of the synchronous motor and the evacuation of the chips is thereafter promoted by return to forward rotation, so that the operating rate of the machine tool including the chip evacuation device is increased.

(3) In case where the load on the synchronous motor is slightly below normal: It is determined that "chips produced with cutting work have decreased or are small in amount" and automatic decrease in the number of rotation of the synchronous motor causes decrease in the power consumption by the synchronous motor and thereby causes decrease in production costs.

(4) In case where the load on the synchronous motor is remarkably below normal: It is determined that "coupling between the synchronous motor and the chip evacuation device has been broken" and a failure in the chip evacuation device is minimized by stoppage of the operation of the synchronous motor and the notification of the abnormality.

In the chip evacuation device that is driven and controlled by the synchronous motor of the invention, prediction of the maintenance and replacement timing for the driving unit of the chip evacuation device and notification of results of such prediction for the operator are better enabled by intermittent or continuous storage of and calculation on the history of the load (current, torque) applied onto the synchronous motor, in comparison with the control by the induction motor and the electromagnetic switch or the magnetic contactor as in the conventional chip evacuation device, and such processing and operations as follows are consequently enabled.

(1) In case where the synchronous motor is used with the load above normal: It is determined that "wear on the driving unit of the chip evacuation device has increased" and the timing of maintenance or replacement earlier than normal is notified so as to decrease a possibility of occurrence of an unpredictable failure due to high load.

(2) In case where the synchronous motor is used with the load below normal: It is determined that "wear on the driving unit of the chip evacuation device has decreased" and the timing of maintenance or replacement later than normal is notified so as to decrease maintenance costs.

In the chip evacuation device that is driven and controlled by the synchronous motor of the invention, furthermore, the movement to and stoppage at an arbitrary position of the synchronous motor or the driving unit that is driven by the synchronous motor, through feedback control using feedback signals from the position detector mounted on the synchronous motor, are better enabled in comparison with use of a control scheme with the induction motor and the inverter as in the chip evacuation device as disclosed in Japanese Patent Application Laid-Open No. 2010-137931 described above. Accordingly, a junction of the belt of the chip conveyor or a fixation screw part for the screw of the chip auger, for instance, can be moved to a position where the operator can easily conduct a work and thus time for the maintenance can be shortened.

In the chip evacuation device of the invention that is driven and controlled by the synchronous motor, in addition to above, the synchronous motor is controlled by the controller different from the controller for the machine tool and thus work for evacuation chips in the machine tool and maintenance work for the chip evacuation device can be carried out even in a state where operation of a main body of the machine tool is stopped by shutdown of a power source therefor.

Though the embodiments of the invention have been described above, the invention is not limited to examples of the embodiments described above and can be implemented in various manners with appropriate modification.

The invention claimed is:

1. A chip evacuation device that evacuates chips produced in a machine tool to outside of the machine tool, the chip evacuation device comprising:
   a synchronous motor as a power source for the chip evacuation device, a load monitoring unit that monitors a load on the synchronous motor or on a driving unit of the chip evacuation device which is operated by the synchronous motor, a threshold storage unit that stores at least one threshold of the load on the synchronous motor or on the driving unit of the chip evacuation device which is operated by the synchronous motor, a comparison unit that makes comparison between the load monitored by the load monitoring unit and the threshold stored in the threshold storage unit, and a synchronous motor control unit that changes a number of rotation or a direction of rotation of the synchronous motor in accordance with results of the comparison made by the comparison unit, wherein the at least one threshold stored in the threshold storage unit defines a first load region, and wherein the synchronous motor control unit increases at least either of the number of rotation and a frequency of operation of the synchronous motor when the load monitored by the load monitoring unit is in the first load region in the results of the comparison.

2. The chip evacuation device according to claim 1,
wherein the at least one threshold stored in the threshold storage unit defines a second load region higher than the first load region, and wherein the synchronous motor control unit carries out at least either of stoppage of the operation of the synchronous motor and notification of abnormality when the load monitored by the load monitoring unit is in the second load region in the results of the comparison.

3. The chip evacuation device according to claim 1,
wherein the at least one threshold stored in the threshold storage unit defines a second load region higher than the first load region, and wherein the synchronous motor control unit is configured to cause of reverse rotation of the synchronous motor for a certain period time and subsequent return to forward rotation when the load monitored by the load monitoring unit is in the second load region in the results of the comparison.

4. The chip evacuation device according to claim 1, wherein the synchronous motor control unit is provided on a controller different from a controller that controls the machine tool.

5. A chip evacuation system, comprising:
a plurality of chip evacuation devices according to claim 1,
wherein the plurality of chip evacuation devices are controlled by one controller.

6. The chip evacuation device according to claim 1, wherein control over the synchronous motor is carried out based on command codes of a machining program for the machine tool.

7. The chip evacuation device according to claim 1, wherein control over the synchronous motor is carried out based on information on cutting load at the time of machining by the machine tool.

8. The chip evacuation device according to claim 2,
wherein the at least one threshold stored in the threshold storage unit defines a third load region lower than the first load region, and wherein the synchronous motor control unit decreases at least either of the number of rotation and the frequency of operation of the synchronous motor when the load monitored by the load monitoring unit is in the third load region in the results of the comparison.

9. The chip evacuation device according to claim 8,
wherein the at least one threshold stored in the threshold storage unit defines a fourth load region lower than the third load region, and wherein the synchronous motor control unit carries out at least either of the stoppage of the operation of the synchronous motor and the notification of abnormality when the load monitored by the load monitoring unit is in the fourth load region in the results of the comparison.

10. A chip evacuation device that evacuates chips produced in a machine tool to outside of the machine tool, the chip evacuation device comprising:
a synchronous motor as a power source for the chip evacuation device, a load monitoring unit that monitors a load on the synchronous motor or on a driving unit of the chip evacuation device which is operated by the synchronous motor, a threshold storage unit that stores at least one threshold of the load on the synchronous motor or on the driving unit of the chip evacuation device which is operated by the synchronous motor, a comparison unit that makes comparison between the load monitored by the load monitoring unit and the threshold stored in the threshold storage unit, a synchronous motor control unit that changes a number of rotation or a direction of rotation of the synchronous motor in accordance with results of the comparison made by the comparison unit, a load history storage unit that stores a history of load status of the synchronous motor, an estimation unit that estimates status of wear on and maintenance and replacement timing for the synchronous motor or the chip evacuation device based on the history of the load status, and a notification unit that notifies the maintenance and replacement timing based on results of estimation by the estimation unit.

* * * * *